July 15, 1952     C. C. PETERSEN     2,603,252
GUARD FOR SAWS
Filed June 30, 1947                      2 SHEETS—SHEET 2
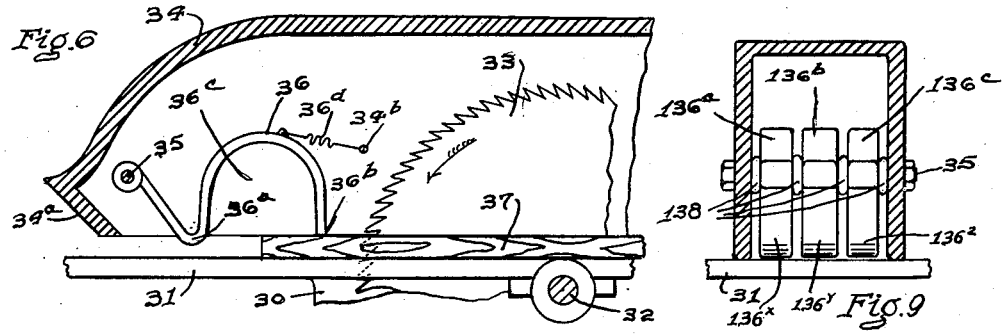
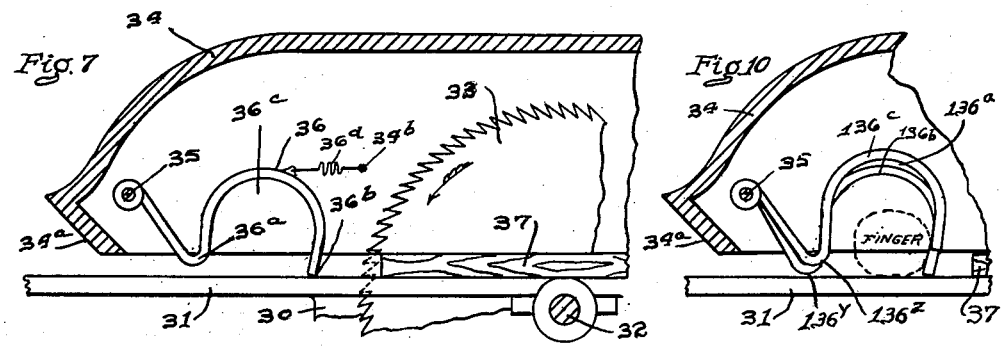
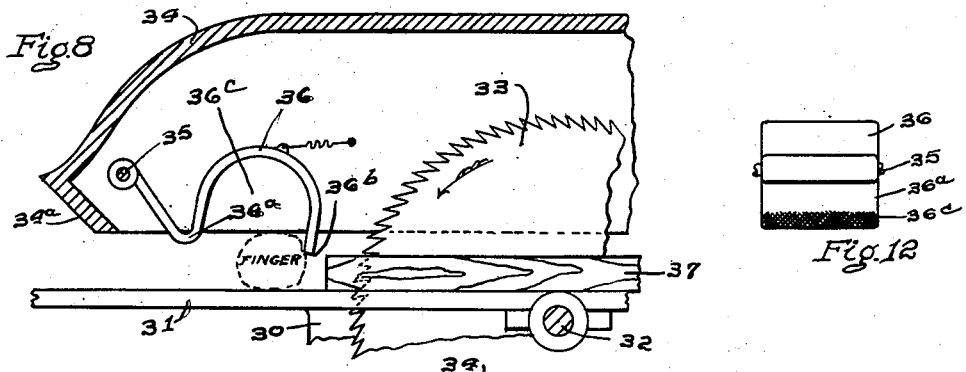
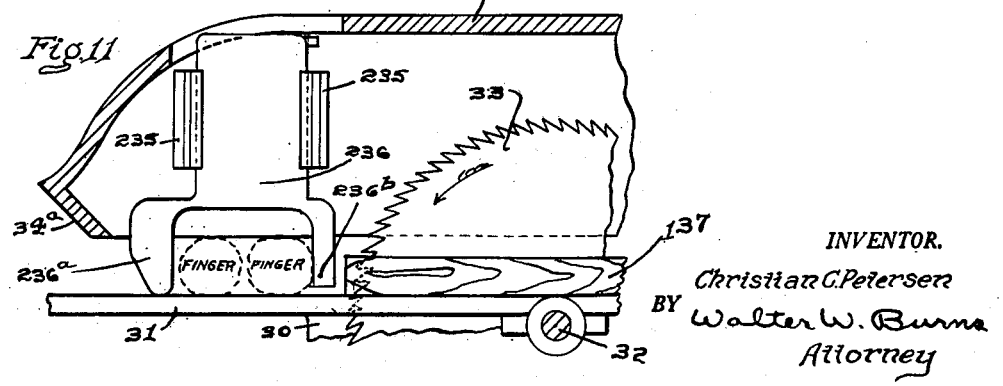
INVENTOR.
Christian C. Petersen
BY Walter W. Burns
Attorney Patented July 15, 1952

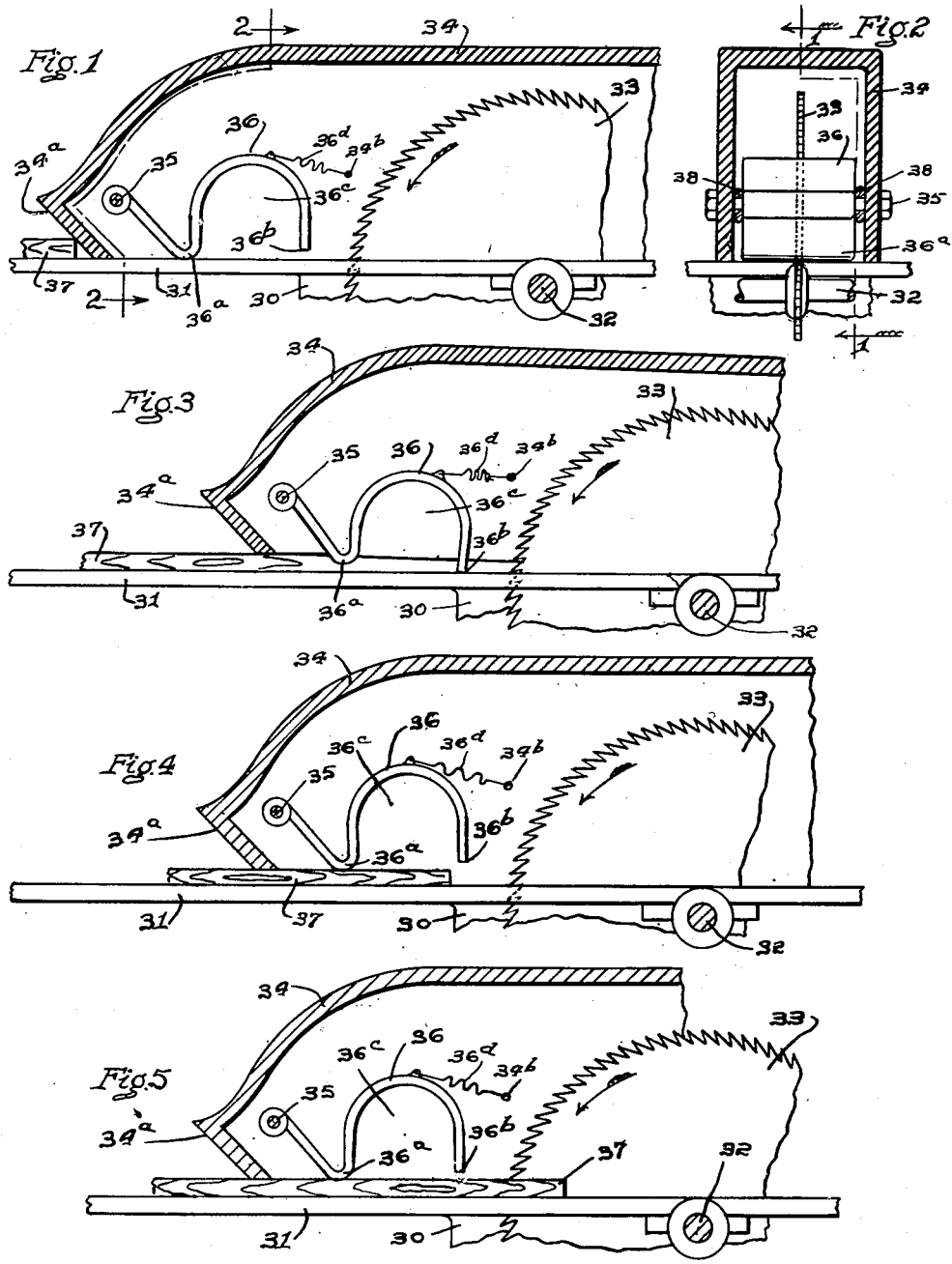

2,603,252

UNITED STATES PATENT OFFICE 2,603,252

GUARD FOR SAWS

Christian C. Petersen, Brooklyn, N. Y.

Application June 30, 1947, Serial No. 758,050

12 Claims. (Cl. 143—159)

1

This invention relates to saw guards and has particular relation to that type of guard wherein there is a special protection provided against the approach of the finger of the operative toward a saw blade.

In the operation of saws and particularly circular saws there is a tendency of the operative to force the piece of work under the guard with a hand to a point where the hand is liable to come into contact with the saw blade. This tendency often results in injury to the hand. The likelihood of injury is increased when the resistance to the forward movement of the work is decreased by either the saw reaching the end of the work or by the saw coming into a softer part of the board or other material being cut, near the end of the cut.

The primary object of this invention is the provision of an improved guard for a saw.

Another object of the invention is the provision of a saw guard wherein, on the approach to a saw blade, the finger of the operative will encounter a movable projection which with normal persons will cause an instinctive withdrawal of the hand from the dangerous position.

A further object of the invention is the provision of a saw guard wherein, after a warning contact with a projection when a dangerous position of the hand is reached, a second projection will fall into the path of the hand or finger of the operative to further intercept and provide protection against the hand or finger moving into contact with the teeth of the saw.

A still further object of the invention is the provision of a saw guard pivoted within a saw-covering main guard and having a warning projection relatively farther from the saw and a second projection relatively nearer to the saw and in position to be engaged successively by the hand or finger of the saw operative.

Another and still further object of the invention is the provision of a saw guard wherein there are a plurality of projections which are so placed as to come into position to be engaged successively by the hand or finger of the operative, one being above the level of the contacting position when the other is in position for contact.

Still another object of the invention is the provision of an inner guard for the usual type of saw guard which, in the normal operation of the saw, will first warn of danger and then will prevent the operative from accidentally having his fingers come into contact with the saw teeth.

Other and further objects of the invention will be apparent to one skilled in the art from a reading of the complete specification.

Referring to the drawing wherein the invention has been illustrated,

Fig. 1 is a vertical cross sectional view illustrating the preferred form of the invention, the section taken on the line 1—1 of Fig. 2.

Fig. 2 is a cross sectional view on the line 2—2 of Fig. 1.

Fig. 3 is a view similar to Fig. 1 but showing a piece of work, as a board, being forced under the main guard member toward a position where it will be cut by the saw.

Fig. 4 is a view similar to Fig. 1 with the board in position where it has just raised the inner guard to its upper position.

Fg. 5 shows the inner guard with the board or work being cut by the saw.

Fig. 6 shows the inner guard with the first or warning projection dropped to permit the stop of the inner guard to be in position ready to drop to its full protective position as the end of the board passes its edge.

Fig. 7 shows the inner guard in full protective position.

Fig. 8 illustrates the position of the inner guard when the operative's finger inadvertently enters the space beneath the main guard, after the board or other work has reached the end of the cut by the saw.

Fig. 9 is a detailed elevational end view of a modified form of the inner guard.

Fig. 10 is a side view of Fig. 9 illustrating how the hand is held from injury.

Fig. 11 is a modification of the invention which utilizes straight up and down movement instead of pivoted movement, for the inner guard.

Fig. 12 is a detailed view of the inner guard 36 with the surface of the projection 36a roughened.

Similar reference characters refer to the same or similar parts throughout the specification and drawing.

The illustration of the invention in the drawing and the description in the specification refer to the construction as applied to a circular saw but the invention may be used with any saw for which it is adapted.

In the form of the invention illustrated in Figs. 1 to 8, 30 designates the base or standard of a circular saw and 31 the table upon which the work rests when being cut by the saw. Mounted in bearings just below the table surface is a shaft 32 which supports the saw 33. Above the saw 33 is mounted a saw guard 34 which is of a very usual construction and movable in a substantially vertical plane.

This usual or outer guard 34 provides a protecting cover for the saw and is intended to prevent accidental contact of the hands and fingers of the operative with the teeth of the saw.

The guard 34 as shown, has a top and sides but is open at the bottom and has a periphery which, when the saw is not in use, is normally in contact with the top surface of the table 31.

However, since the guard 34, during the sawing operation, has to be in a raised position off of the upper surface of the table 31, there is a space left unguarded in which the hands and fingers of the operative sometimes enter to come into contact with the saw teeth. It is this space which it is desired to close against passage of the hands and the fingers, thus preventing their contact with the teeth of the saw.

At the end of the guard nearest the operative, and in the illustrated form, though not necessarily, in the sides thereof, I provide bearings for a pivot 35. This pivot 35 supports, at one end, the inner guard member 36. The guard member 36 is of a suitable shape which preferably will first warn the operative by the latter coming into contact with a portion of its structure and if movement by the hand or finger of the operative is continued toward the saw, a stop portion will present itself and bar further movement, thus preventing contact with the saw teeth.

Adjacent the pivot 35, the inner guard 36 has a projection or finger 36a, which when the saw is not in use projects to a position of contact with the table 31. At a portion of the inner guard 36 which is more remote from the pivot 35 than the projection or finger 36a, there is provided a portion which I term the obstructing projection. This second projection I have designated by the reference character 36b. Between the projection or finger 36a and the obstructing projection 36b, is a spacing 36c. This spacing 36c may be of a size to receive one or more fingers of the operative without interference with the vertical swinging of the inner guard 36 as will more clearly later appear.

In the normal operation of the saw, the board or other work 37 is brought up to and against the inclined portion 34a of the outer guard member 34 which raises the guard to permit the work to pass thereunder. As the forward edge of the work 37 reaches the projection 36a, the inner guard member 36 is raised until the projection 36a is level with the bottom periphery of the outer guard. This position of the projection 36a, places the second projection 36b above the surface of the work.

The inner guard member 36 remains in the position until the end of the work approaches the saw teeth. As soon as the end of the work passes the second projection 36b of the inner guard 36, the projection will drop on the operative's finger or hand if the work is thick relative to the hand and will intercept the forward movement of the finger or hand if the work is relatively thin.

If desired, the contacting surface of the projection 36a may be roughened as at 36e in Fig. 12. This roughened surface will cause an instinctive withdrawal of the hand of an operative having normal reactions.

In order to give the guard 36 a stronger tendency to fall than will be given by gravity, there is provided a spring 36d which is attached to the upper portion of the guard at one end and to any other suitable point as the outer guard as at 34b.

In order to provide sufficient clearance between the sides of the guard 36, there is placed a separating washer 38 which prevents contact between the guard and the sides of the outer guard 34.

In Figs. 9 and 10, I have illustrated a modified form of the invention wherein instead of having a unitary inner guard member 36, there are provided a plurality of sectional coacting parts placed side by side and supported by and on the same pivot 35. These similarly shaped inner guard member sections, I have designated by the reference characters 136a, 136b, and 136c. These inner guard member sections 136a, 136b and 136c are separated from the sides of the outer guard member 34 and from each other by the separator washer members 138.

As the work is forced through under the outer guard 34, when the end of the work 137 is about to reach the saw teeth, the edge of the work 137 will pass beyond the lower projections corresponding to the projections 36a and then beyond the finger ends of the inner guard members 136a, 136b and 136c. These ends, because of the separation of the members 136a, 136b and 136c, will fall by gravity, or spring, independently of each other, as soon as they are not supported by the work. Because of the normal angularity of position of the hand and fingers with relation to the plane of the saw, some of the ends, corresponding to the projections 36c will fall first. Any such guard member will at once obstruct the passage of the finger or hand of the operative, either by placing itself in front of the finger or hand or by contact with the upper surface of the same.

In the case of both types of inner guards, 36 and 136a, 136b and 136c, if the board or work 37 is of greater thickness than the finger or hand at the point of contact with the work, then as soon as the inner guard member projections 36a, 136x, 136y or 136z are passed by the work 37, the inner guard member so passed will at once drop upon the finger or hand of the operative and give it a grip which will stop movement toward the saw teeth. If, on the other hand, the work 37 is of less thickness than the finger or hand of the operative, then the finger or hand will be positively stopped in its forward movement as soon as the inner guard is reached, and before the second projection of the inner guard reaches the end of the work 37.

In case the finger or hand is about the same height as the end of the work 37, then the normal taper of the hand or finger will provide the inner guard with a place to exert its influence on the forward movement of the hand or finger. However, the repeated warning given by the first and second projections of the inner guard are sufficient to prevent accidental contact of the hand or fingers with the saw teeth.

It is to be noted that when the guard sections 136a, 136b and 136c are used, the passage of the fingers to a dangerous position is made still more difficult since with the fingers and hand at an oblique position, as usually used, one or more of the guard sections will surely obstruct the movement of the finger or hand and prevent accidental contact with the saw.

While wilful violation of safety codes by the operatives of machines cannot be prevented, it is believed that the instant invention will provide full protection to all users who do not take definite action to prevent the safety device from acting for their protection.

In the form illustrated in Fig. 11, the guard 236 is shown as mounted slidably in guide means 235. In this form, the guard 236 moves up and down substantially vertically and its projections 236a and 236b have the same distance of travel. In this form, the projection 236a extends downwardly slightly farther than the projection 236b. The latter may, if desired, be provided with a roughened end as shown in Fig. 12 for the end 36.

The guard members may be made of metal or any suitable material including plastics. In the case of plastics, if a transparent plastic is used, it may be possible to see the saw and its complete operation, which will further the cause of safety operation.

While modifications of this invention have been illustrated and described in detail, it is to be understood that the illustration as adapted to the circular saw and the details of construction of the invention are merely illustrative and that modifications and changes in the construction and support, may be made without departing from the spirit of the invention and within its scope as claimed.

Having described my invention, what I claim is:

1. A protective guard means for a saw comprising an outer guard in position for resting on the top surface of the work being cut, the outer guard having side portions, an integral inner guard means within the outer guard and between the operator and the place of cutting of the saw, the inner guard means comprising a projection movable to a position in front of the place of cutting of the saw and in the path of the operative's hand, and a second projection between the first projection and the saw position, the projectons being movable up and down simultaneously, the second projection having guiding means for guiding it in a generally vertical movement and having a substantially vertical finger-contacting surface in front of the saw to form an abutment stop to prevent contact of the finger with the saw.

2. A protective guard means for a saw comprising an outer guard for resting on the top surface of the work being cut, the outer guard having side portions, an integral inner guard means supported from the sides of the outer guard and movable with relation thereto, to a place in the path of the hand of the operator, the inner guard means having two successive projections along the path of the work and movable up and down simultaneously, the projection nearest the saw having guiding means for guiding it in a generally vertical movement and having a substantially vertical finger-contacting surface in front of the saw to form an abutment stop to prevent contact of the finger with the saw.

3. A guard means for a saw comprising an outer guard for resting on the top surface of the work being cut, an integral inner guard means mounted on and supported from the outer guard and movable up and down with relation thereto, the inner guard having a plurality of projections at different levels, one of which is in front of the saw in position to contact the work as it starts toward the saw and has a beveled face to raise the inner guard on contact with the work and another projection substantially rigid with the first contacted projection in a relative position to be held out of a contacting position with the work while the first contacted projection is in contact with the work, and between the first projection and the saw to be permitted to contact the work as the work passes out from under the first contacted projection, the projection nearest the saw having guiding means for guiding it in a generally vertical movement and having a substantially vertical finger-contacting surface in front of the saw to form an abutment stop to prevent contact of the finger with the saw.

4. A protective guard means for a saw comprising an outer guard for resting on the top surface of the work being cut, an integral inner guard means supported from the outer guard and having a plurality of successive work engaging projections at different levels with a space between the projections of a size to receive a finger of the operative, the projections being in position relative to the saw to drop into the space between the operative and the saw blade, the projection nearest the saw having guiding means for guiding it in a generally vertical movement and having a substantially vertical finger-contacting surface in front of the saw to form an abutment stop to prevent contact of the finger with the saw.

5. A protective guard means for a saw comprising an outer guard for resting on the top surface of the work being cut, an integral inner guard means pivotally supported with relation to the outer guard and having a plurality of unequally spaced projections normally tending to approach the top of the table in front of the saw cutting edge, the projection nearest the saw having guiding means for guiding it in a generally vertical movement and having a substantially vertical finger-contacting surface in front of the saw to form an abutment stop to prevent contact of the finger with the saw.

6. A protective guard means for a saw comprising an outer guard for resting on the top surface of work being cut, an integral inner guard means pivotally supported with relation to the outer guard and having spaced projections at varying distances from the saw edge, the projections normally tending to approach the top of the table between the operative and the saw cutting edge, the projection nearest the saw having guiding means for guiding it in a generally vertical movement and having a substantially vertical finger-contacting surface in front of the saw to form an abutment stop to prevent contact of the finger with the saw.

7. A protective guard means for a saw comprising an integral guard unit having a plurality of relatively rigid projections in position in front of the saw cutting edge, and guiding means for guiding the guard projections in a vertical plane at different levels, and substantially in the plane of the saw and at varying distances from the cutting edge of the saw and normally tending to approach the top surface of the table in front of the saw, the projections being placed at different levels on the guard member so that, as the work passes from under the first projection, the other projection will come into contact with the upper surface of the work and permit the first-named projection to come to a level lower than the upper surface of the work, the projection nearest the saw having guiding means for guiding in a generally vertical movement and having a substantially vertical finger-contacting surface in front of the saw to form an abutment stop to prevent contact of the finger with the saw.

8. A protective guard means for a saw comprising a guard member movable substantially in a vertical plane and having a rigid unit provided with a plurality of relatively rigid projections substantially in the plane of the saw and at varying distances from the cutting edge of the saw and normally tending to approach the top surface of the table in front of the saw, the projections of the guard being spaced a sufficient distance apart to permit the entry of a finger of the operator therebetween, the projection nearest the saw having guiding means for guiding it in a generally vertical movement and having a substantially vertical finger-contacting surface in front of the saw to form an abutment stop to prevent contact of the finger with the saw.

9. A protective guard means for a saw comprising a pivoted guard member movable substantially in a vertical plane and having its pivot between the position of the operator and the cutting edge of the saw and having a stop projection normally tending to approach the top surface of the table between the cutting edge of the saw and the pivot, and a second stop projection rigid with the first projection of the guard member spaced sufficiently from the first-named projection to provide a space for a finger of the operator, the projection nearest the saw having guiding means for guiding it in a generally vertical movement and having a substantially vertical finger-contacting surface in front of the saw to form an abutment stop to prevent contact of the finger with the saw.

10. A protective guard means for a saw comprising a support, a pivoted guard member on the support and movable substantially in a vertical plane and having its pivot between the position of the operator and the cutting edge of the saw and having a projection normally tending to approach the top surface of the table between the cutting edge of the saw and the pivot and a second projection on the guard member and integral with the first projection spaced sufficiently from the first-named projection to provide a space for a finger of the operator, this second projection being farther from the cutting edge of the saw than the first-named projection and being out of the plane passing through the pivot and first projection and so placed on the guard that when the work clears the second projection and said second projection moves downwardly, this latter will come to a lower level than either the upper surface of the work or the first named projection, the projection nearest the saw having guiding means for guiding it in a generally vertical movement and having a substantially vertical finger-contacting surface in front of the saw to form an abutment stop to prevent contact of the finger with the saw.

11. A protective guard means for a saw comprising an outer guard for resting on the top of the work being cut, an integral inner guard means pivotally mounted on and supported by the outer guard, the inner guard having a first projection in the path of the work and a stop abutment projection normally tending to swingingly approach the top of the table in front of the saw cutting edge, the first projection being in the path of the work to be first contacted thereby, and mounted on the inner guard in position to hold the stop abutment projection out of the path of the work until the work has passed the first projection, the stop abutment projection being supported in position, with relation to the pivot so that its lower end will travel in a substantially vertical movement and having a substantially vertical finger-contacting surface.

12. A protective guard means for a saw, comprising a pivot, a support for the pivot, a pivoted guard member on the pivot and swingingly movable substantially in a vertical plane, the pivot being between the position of the operator and the cutting edge of the saw, the guard having a projection between the pivot and the saw position, a stop abutment projection on the guard between the first projection and the saw position and normally tending to approach the table surface between the pivot and the position of the saw cutting edge, the pivot and projections being so placed relative to each other than lines passing through the respective projection ends and the pivot will make different angles with relation to the horizontal, so that when work clears the first projection, the stop abutment projection will move downwardly to a lower level than the upper surface of the work and permit the stop abutment to come in contact with the work, the stop abutment projection being supported in position with relation to the pivot, so that its lower end will travel in a substantially vertical movement, the stop abutment having a substantially vertical finger-contacting surface.

CHRISTIAN C. PETERSEN.

REFERENCES CITED

The following references are of record in the file of this patent:

UNITED STATES PATENTS

| Number | Name | Date |
|---|---|---|
| 65,347 | Clark | June 4, 1867 |
| 997,720 | Troupenat | July 11, 1911 |
| 1,074,198 | Phillips | Sept. 30, 1913 |
| 1,594,772 | Fournier | Aug. 3, 1926 |
| 2,010,851 | Drummond | Aug. 13, 1935 |

FOREIGN PATENTS

| Number | Country | Date |
|---|---|---|
| 26,400 | Germany | Mar. 26, 1884 |
| 385,083 | Germany | Nov. 16, 1923 |
| 153,002 | Austria | Apr. 11, 1938 |